(12) United States Patent
Gergely

(10) Patent No.: US 11,510,402 B2
(45) Date of Patent: Nov. 29, 2022

(54) FISHING GAFF HOOK

(71) Applicant: WINTHROP TACKLE, Essex, CT (US)

(72) Inventor: Chris Gergely, Enfield, CT (US)

(73) Assignee: WINTHROP TACKLE, Essex, CT (US)

( * ) Notice: Subject to any disclaimer, the term of this patent is extended or adjusted under 35 U.S.C. 154(b) by 280 days.

(21) Appl. No.: 16/749,317

(22) Filed: Jan. 22, 2020

(65) Prior Publication Data

US 2021/0219533 A1   Jul. 22, 2021

(51) Int. Cl.
*A01K 97/14*   (2006.01)

(52) U.S. Cl.
CPC .................... *A01K 97/14* (2013.01)

(58) Field of Classification Search
CPC ......... A01K 97/14; A01K 97/24; A47F 13/06; A45F 5/102; B66F 19/00; B63C 11/50; F16C 32/06; F16C 19/00; F16C 17/00
USPC ..... 294/19.3, 26, 175; 16/2.1, 2.2; 43/42.11, 43/42.12, 42.13, 42.14, 42.16, 42.17, 43/42.19, 42.2, 42.21; 119/780
See application file for complete search history.

(56) References Cited

U.S. PATENT DOCUMENTS

| | | | | |
|---|---|---|---|---|
| 760,181 A * | 5/1904 | Buschemeyer | ........ | A01K 97/14 43/5 |
| 2,054,055 A * | 9/1936 | Percival | ................... | F16C 32/06 384/115 |
| 2,621,437 A * | 12/1952 | Pedranti | .................. | A01K 85/10 43/42.19 |
| 2,677,911 A * | 5/1954 | Fink | ........................ | A01K 97/14 43/5 |
| 3,945,065 A * | 3/1976 | Dushku | ..................... | B25F 1/00 7/161 |
| 3,991,502 A * | 11/1976 | Tudisco | ................. | A01K 97/14 43/5 |
| 4,209,932 A * | 7/1980 | Pate | ........................ | A01K 85/00 43/42.11 |
| 4,769,939 A * | 9/1988 | Gonska | .................. | A01K 97/01 294/2 |
| 4,815,233 A * | 3/1989 | Pingel | .................... | A01K 85/00 43/42.11 |
| 4,884,359 A * | 12/1989 | Wray | ..................... | A01K 85/10 43/42.19 |
| 5,400,542 A * | 3/1995 | Johnson | ................. | A01K 85/01 43/42.13 |
| 5,482,271 A * | 1/1996 | McNutt | .................. | A01K 97/14 119/808 |
| 6,574,905 B2 * | 6/2003 | Peeples | .................. | A01K 97/14 43/5 |
| 7,503,139 B1 * | 3/2009 | Fitzgerald | .............. | A01K 97/14 294/26 |
| 2002/0100207 A1 * | 8/2002 | Peeples | .................. | A01K 97/14 43/5 |
| 2012/0204468 A1 * | 8/2012 | Constantine | ........... | A01K 97/14 43/5 |
| 2012/0291713 A1 * | 11/2012 | Brown | ................... | A01K 97/14 119/201 |
| 2017/0347637 A1 * | 12/2017 | Constantine | ........... | A01K 83/00 |

* cited by examiner

*Primary Examiner* — Darren W Ark
*Assistant Examiner* — Zoe Tam Tran
(74) *Attorney, Agent, or Firm* — Cantor Colburn LLP

(57) ABSTRACT

A fishing gaff hook including a rotatable eyelet.

6 Claims, 3 Drawing Sheets

FISHING GAFF HOOK

BACKGROUND

The present disclosure generally relates fishing devices, and more particularly, to a fishing gaff hook for engagement and capture of a relatively large fish.

Gaff hooks are well known devices for pulling fish out of the water or for engaging other objects to pull them out of the water or to assist in berthing a boat by making a connection with a pier or a buoy and pulling the boat close enough to tie it up with a line. In most instances, a gaff hook device is a stiff handle, 3-6 feet in length, with a hook affixed to one end.

BRIEF SUMMARY

Embodiments of the present invention are directed to fishing gaff hooks. In one or more embodiments, a fishing gaff hook includes a cylindrical body including a first end and a second end, wherein the cylindrical body has a curvilinear shape, wherein the first end comprises a terminal barb and the second end is configured to fixedly engage a rod; a sleeve proximate to the second end and fixedly attached to the cylindrical body, wherein the sleeve has a width W1; and a rotatable eyelet proximate to the second end and rotatably mounted on the cylindrical body, wherein the rotatable eyelet comprises an eyelet body including an aperture and at least two parallel spaced bushings extending from the eyelet body, wherein at least two of the bushings are spaced apart by at least W1, and wherein the sleeve is intermediate the at least two bushings spaced apart by W1.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
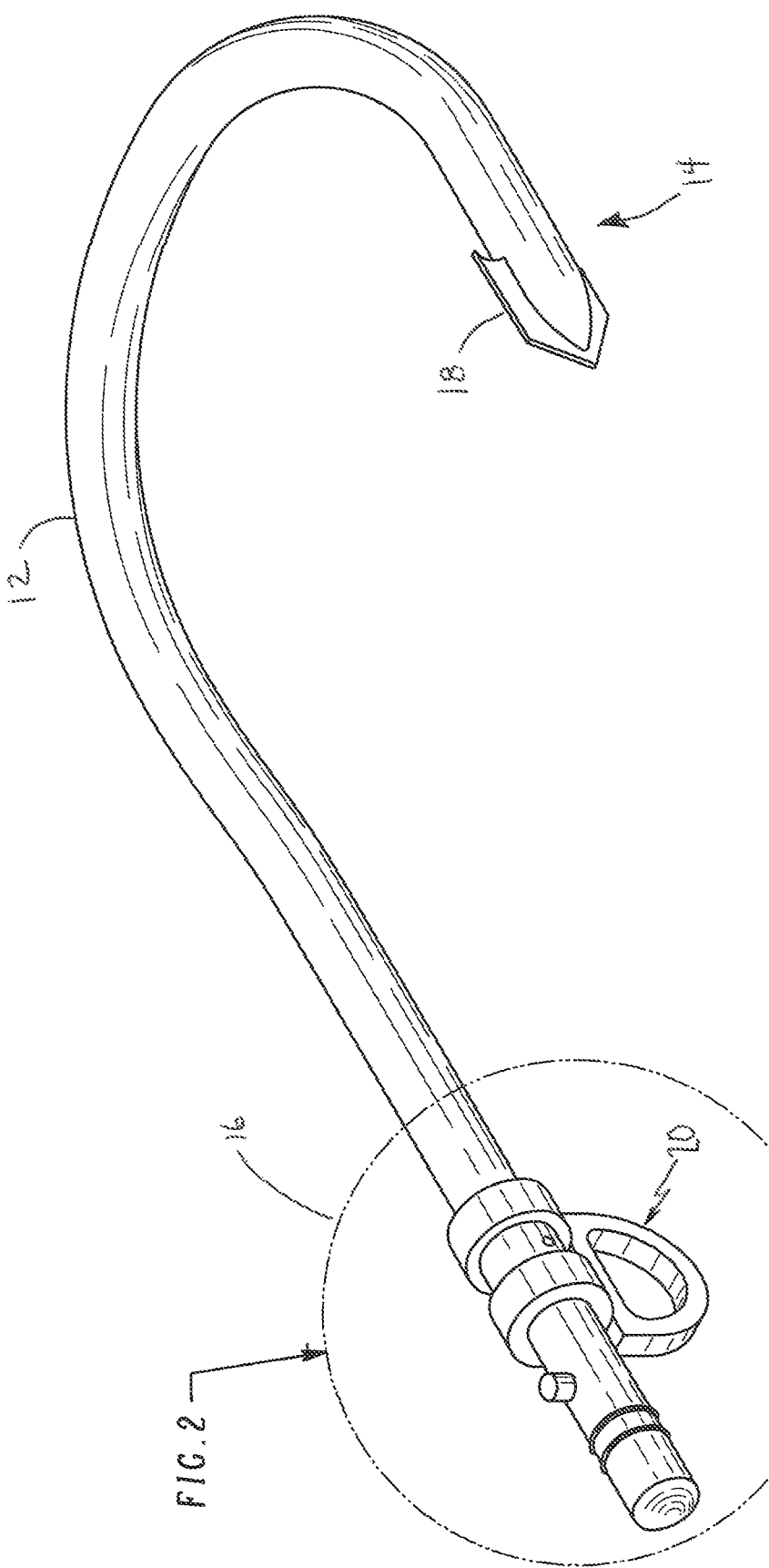
FIG. 1 is a perspective view of a fishing gaff hook in accordance with the present disclosure.
Figure 2:
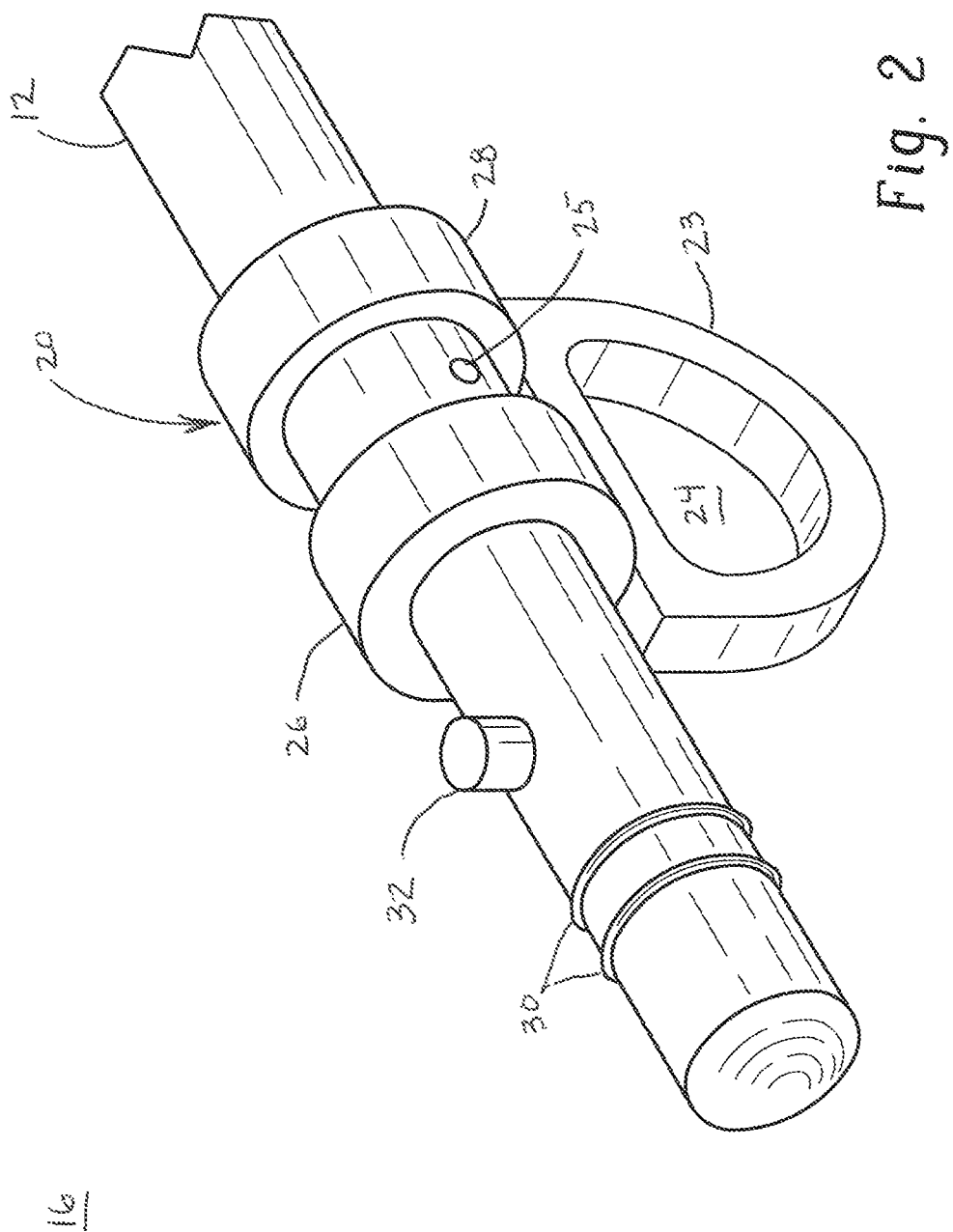
FIG. 2 is an enlarged perspective view of a rotatable fishing eyelet of the fishing gaff hook in accordance with the present disclosure.
Figure 3:
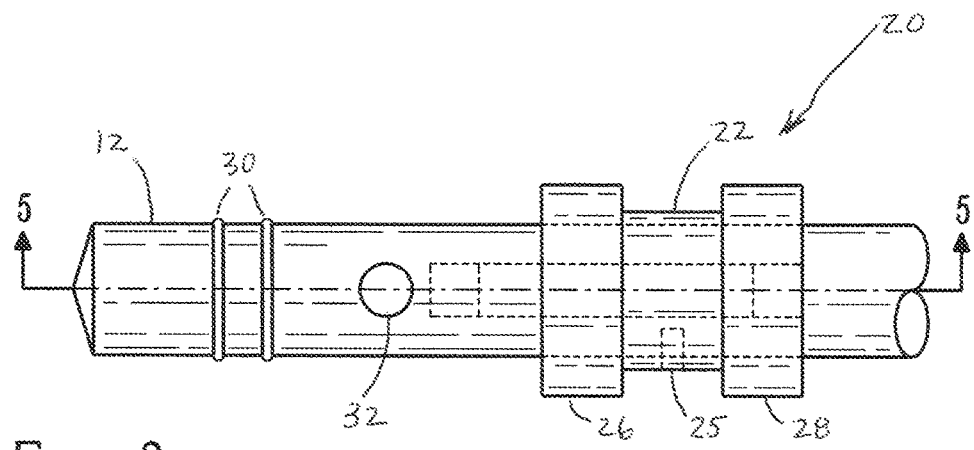
FIG. 3 is a top down view a rotatable fishing eyelet of FIG. 2 in accordance with the present disclosure.
Figure 4:
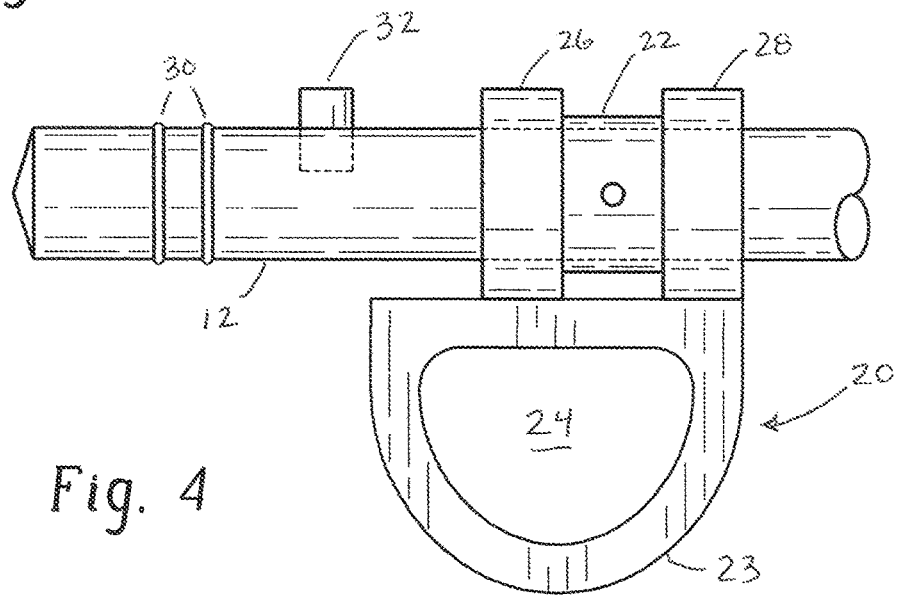
FIG. 4 is a side elevational view a rotatable fishing eyelet of FIG. 2 in accordance with the present disclosure.
Figure 5:
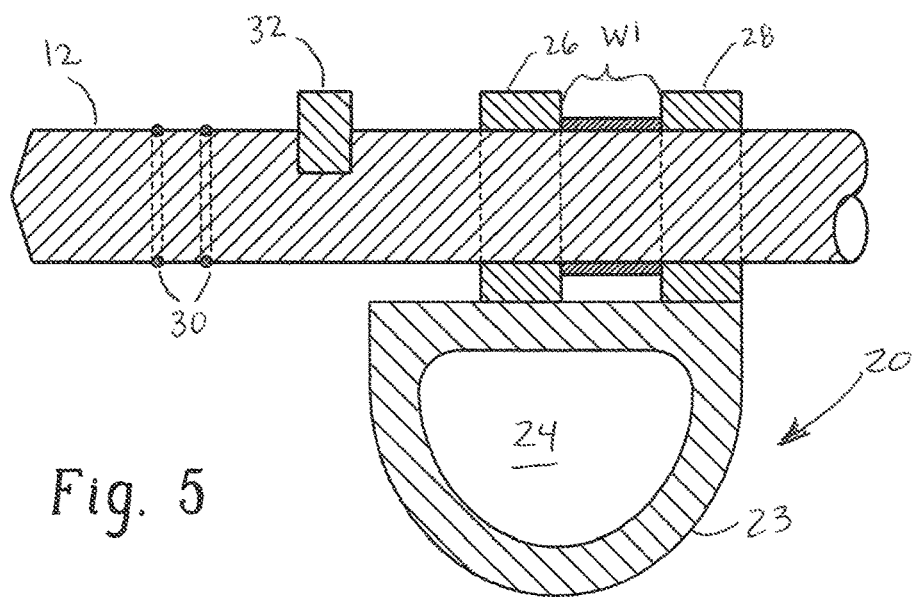
FIG. 5 is a side sectional view of a rotatable fishing eyelet of the fishing gaff hook taken along lines 5-5 of FIG. 3 in accordance with the present disclosure.

In the accompanying figures and following detailed description of the disclosed embodiments, the various elements illustrated in the figures are provided with two digit reference numbers. With minor exceptions, the leftmost digit(s) of each reference number correspond to the figure in which its element is first illustrated.

DETAILED DESCRIPTION

Disclosed herein is fishing gaff hook for a gaff hook rod. The gaff hook is generally configured to engage and secure a relatively large and/or powerful fish after capture using a rod and reel, a net, or some other fishing device. The gaff hook provides a mechanical advantage to the end user and is configured to deeply penetrate the flesh of the fish so that the fish can be leveraged from the water and hoisted onto the vessel. The rod and reel is not practical by itself to raise a fish from the water and onto the vessel given the rod's flexibility. In contrast, the fishing gaff hook and fishing gaff hook rod are substantially inflexible and can be formed of a high strength material, such as stainless steel, although in other embodiments, a high strength but substantially lightweight material such as aluminum can be used, which is especially adapted to facilitate landing of relatively large and difficult-to-handle fish. Other alloys can be employed.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The invention can best be understood and appreciated by reference to the attached drawings. In FIG. 1 there is shown a perspective view of a fishing gaff hook 10 in accordance with the present disclosure. The fishing gaff hook generally includes a cylindrical body 12 including a first end 14 and a second end 16. In one or more embodiments, the cylindrical body 12 is generally j-shaped or u-shaped. In one or more other embodiments, the cylindrical body can include compound bends as may be desired for different applications.

The first end 14 includes a terminal barb 18, which is configured to facilitate initial entry of the gaff hook 10 into the flesh of the fish. The second end 16 is configured to engage a fishing gaff rod (not shown), which secures the fishing gaff hook in a fixed, non-rotatable position relative to the rod. The fishing gaff rod is not intended to be limited and can be linear or non-linear as may be desired for different applications. The fishing gaff rod generally includes a female receiving portion for securing the second end (i.e., the male end) of the gaff hook to the rod. Proximate to the second end 16 is an rotatable eyelet 20 mounted on the cylindrical body 12 of the fishing gaff hook 10.

During use, a rope can be secured to the rotatable eyelet 20, which provides the end user with an eyelet that can be rotated to different positions depending on the location of the fish relative to the fishing gaff hook and end user so as to provide maximum leverage when hoisting a relatively large fish or a fish that is difficult to handle onto the fishing vessel. The end user can pull on the eyelet using the rope to maximize leverage. Likewise, the eyelet 20 can be rotated to different positions to provide the end user with maximum leverage when removing the gaff hook from the fish. The use of fixed eyelets can result in twisting of the gaff hook, which can damage the fish and possibly result in disengagement of the gaff hook with the fish.

Turning now to FIGS. 2-5, there are shown various enlarged views of the second end 16 including the rotatable eyelet 20. The second end 16 includes a sleeve 22 that is fixedly mounted onto the cylindrical body 12, which has a defined width W1. The sleeve 22 is fixedly attached to the cylindrical body 12 by pin 25 extending through the sleeve 22 and partly into the cylindrical body 12 as shown more clearly in FIG. 3.

The rotatable eyelet 20 includes an eyelet body 23 having an aperture 24 therein dimensioned to accommodate a rope during use and at least two spaced apart parallel bushings 26, 28 extending from the eyelet body 23. The spacing between the two parallel bushings is equal to or slightly greater than the sleeve width W1.

In one or more embodiments, the first end 16 can further include o-rings 30 mounted within a groove formed in the cylindrical body 12, two of which are shown, and a pin 32. The pin 32 is configured to engage a slot opening in the rod (not shown). It should be apparent that the mechanism for attaching the fishing gaff hook 10 to a fishing gaff rod is not intended to be limited to the particular embodiment shown and can be of any variation known in the art.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fishing gaff hook comprising:
   a rigid inflexible cylindrical body formed of steel or aluminum including a first end and a second end, wherein the cylindrical body has a curvilinear shape, wherein the first end comprises a terminal barb and the second end is configured to fixedly engage a rod;
   a stationary sleeve proximate to the second end and fixedly attached to the cylindrical body with a first pin inserted into the sleeve and the cylindrical body, wherein the sleeve has a width W1; and
   a one-piece rotatable eyelet proximate to the second end and rotatably mounted on the cylindrical body, wherein the rotatable eyelet comprises an eyelet body including an aperture dimensioned to accommodate a rope and at least two parallel spaced bushings including cylindrically shaped openings extending from the eyelet body, wherein the at least two parallel spaced bushings are spaced apart by a spacing that is equal to or greater than to the width W1 and rotatably mounted to the rigid inflexible cylindrical body, and wherein the fixedly attached sleeve is intermediate the at least two bushings spaced apart by the spacing that is equal to or greater than the width W1,
   wherein the second end comprises one or more grooves for receiving an o-ring and a second pin transversely protruding from a longitudinal axis of the second end for engaging a slot opening in the rod, wherein the second pin is spaced apart from and intermediate to the one or m ore grooves and the rotatable eyelet.

2. The fishing gaff hook of claim 1, wherein the curvilinear shape comprises compound bends.

3. The fishing gaff hook of claim 1, wherein the curvilinear shape is j-shaped.

4. The fishing gaff hook of claim 1, wherein the curvilinear shape is u-shaped.

5. The fishing gaff hook of claim 1, wherein the eyelet and the sleeve comprise stainless steel or aluminum.

6. A fishing gaff hook assembly comprising the fishing gaff hook of claim 1 and a rod fixedly coupled to the second end of the cylindrical body.

* * * * *